United States Patent [19]

Sekido et al.

[11] 4,414,607
[45] Nov. 8, 1983

[54] SOLID STATE ELECTRIC DOUBLE LAYER CAPACITOR

[75] Inventors: Satoshi Sekido, Yawata; Yoshito Ninomiya, Hirakata; Yoshihiro Yamazaki, Kyoto, all of Japan

[73] Assignee: Matsushita Electric Industrial Co., Ltd., Kadoma, Japan

[21] Appl. No.: 276,518

[22] Filed: Jun. 23, 1981

[30] Foreign Application Priority Data

Jun. 26, 1980 [JP] Japan ................... 55-87292
Aug. 8, 1980 [JP] Japan ................... 55-109388
Dec. 25, 1980 [JP] Japan ................... 55-186427

[51] Int. Cl.³ .................... H01G 9/00; B01J 17/00
[52] U.S. Cl. .................... 361/433; 252/62.2; 29/570
[58] Field of Search ................ 361/433; 252/62.2; 29/570

[56] References Cited

U.S. PATENT DOCUMENTS 4,363,079 12/1982 Sekido et al. .................... 361/433

Primary Examiner—Andrew J. James
Assistant Examiner—Seth Nehrbass
Attorney, Agent, or Firm—Cushman, Darby & Cushman

[57] ABSTRACT

A solid state electric double layer capacitor comprising
a polarization electrode,
a non-polarization electrode, and
a solid electrolyte disposed at least between the polarization electrode and the non-polarization electrode,
the polarization electrode being a mixture of carbon and the solid electrolyte, mixed with each other in a predetermined ratio,
the non-polarization electrode being another mixture of the solid electrolyte and a composition containing Cu and a substance selected from a group consisting of $Cu_2S$ and $TiS_2$, and
the solid electrolyte having a chemical composition of $K_xRb_{1-x}Cu_4I_yCl_{5-y}$ ($0.1 \leq x \leq 0.25$, $1.25 \leq y \leq 1.67$).

7 Claims, 23 Drawing Figures

SOLID STATE ELECTRIC DOUBLE LAYER CAPACITOR

BACKGROUND OF THE INVENTION

1. Field of the Invention

The present invention relates to a capacitive device comprising a solid electrolyte therein and utilizing an electric double layer formed between the solid electrolyte and a polarization electrode.

2. Description of the Priort Art $Ag^+$ ion conductive solid electrolytes such as $RbAg_4I_5$, $NR_4Ag_4I_5$, $Ag_3SI$ and $Ag_6I_4WO_4$ have been known as substances showing high ionic conductivities at room temperature. Such solid electrolytes can be prepared from AgI by substituting it partially with an anion and/or a cation, and have been employed for capacitive devices. However, such conventional capacitive devices employing $Ag^{30}$ ion conductive solid electrolytes have a shortcoming that they are very expensive owing to expensive materials such as silver and silver salt. Therefore, they have been not widely employed.

In recent years, various high $Cu^+$ ion conductive solid electrolytes have been developed. But the so far developed electrolytes with high ionic conductivities employing an organic substance have the following shortcomings, when they are employed for capacitive devices. Such capacitive devices have narrow temperature ranges in the device operations, since the employed organic substance is not sufficiently heat resistive and since an electronic conductivity becomes extremely high at a high temperature range (the increase of the electronic conductivity should be avoided, since charges once stored at the interface between a solid electrolyte and a polarization electrode are liable to disappear into the solid electrolyte by electron conduction). Further, the capacitive devices using Cu counter electrode have the following shortcoming; such capacitive devices have a short cycle life, since Cu dendrite deposited on the counter electrode causes a leak current flowing through the precipitated and deposited compound (in other words, ionic conduction does not play a primal role at this stage). Accordingly, a charge storage capability is worse than that of the conventional capacitive devices containing silver salt.

It has been proposed in a U.S. patent application Ser. No. 105,855, filed on Dec. 20, 1979, now U.S. Pat. No. 4,363,079, assigned to the assignee of the present invention) to provide a solid state electric double layer capacitor comprising a polarization electrode, a counter electrode, optionally, in addition, a reference electrode, and a solid electrolyte disposed at least between the polarization electrode and the counter electrode, the polarization electrode and the counter electrode comprising a mixture of cuprous sulfide and the solid electrolyte, the solid electrolyte comprising CuCl substituted 1/5 of $Cu^+$ ions thereof with $Rb^+$ ions and ¼ to ⅓ of $Cl^-$ ions thereof with $I^-$ ions in CuCl. The recently proposed solid state electric double layer capacitor has more superior device characteristics than those of the conventional capacitive devices employing a solid electrolyte containing silver salt.

It is also proposed in the senior application mentioned above to employ a counter electrode comprising Cu and $Cu_2S$ in a proportion of 60-80 percent by weight for Cu and 40-20 percent by weight of $Cu_2S$. Capacitive devices employing the counter electrode comprising Cu and $Cu_2S$ can overcome the following conventionally known problems, to be described below. In general, when a non-polarization electrode, i.e. counter electrode is made of Cu alone, the capacitors are not usable for long hours. The reason for the inferior device characteristics is that dissolving reaction of Cu has a limit in an electrokinetic point of view. The precipitated Cu can not be dissolved reversibly, and the precipitated Cu is gradually accumulated thus resulting in electric breakdown of the capacitors. On the other hand, when reagent containing $Cu_2S$ is employed for the non-polarization electrode, the dissolving reaction of Cu has a higher limit in the electrokinetic point of view (in other words, a limiting current becomes larger) and potential variations at the counter electrode become smaller than the case of the Cu counter electrode, but a rest potential of the $Cu_2S$ counter electrode becomes noble by about 310 mV in comparison with the Cu potential. This causes lowering of an output voltage by the amount of the noble potential. This adverse lowering of the output voltage in the conventional solid state electrolyte capacitors can be solved by employing the counter electrode which comprises Cu and $Cu_2S$ mixed with each other in a proportion disclosed in the senior application described above.

It has been revealed during the course of further research activities after filing the senior patent application that although the solid state electric double layer capacitors employing the proposed counter electrode have an advantageous feature in that the counter electrode potential can be set to nearly close to the Cu potential, the potential variations at the counter electrode become larger when the capacitors are operated at a low temperature.

It has been proposed in another senior application (Japanese published unexamined patent gazette Sho 52-19256) to carry out a heat treatment in the air for constituents of polarization electrodes comprising active charcoal and a solid electrolyte, for the purpose of dissolving the solid electrolyte well and putting it into porous spaces of the active charcoal. Since carbon contained in the polarization electrode is liable to be oxidized when the polarization electrode is heat-treated in the air, the heating temperature is limited to be under 180° C. Solid state electric double layer capacitors employing the polarization electrode material heat-treated at a temperature under 180° C. have inferior device characteristics in that a capacitance obtainable at 20° C. becomes smaller by 20-30% at −25° C., and in that capacitance variations with time lapse are observed to be on the same order when the capacitance is measured after 200 hours with voltage application at 70° C.

On the other hand, it is necessary to employ electrochemically stable materials, i.e. materials with low ionization tendencies, for conductive materials used for the current collectors of the polarization and non-polarization electrodes, and for the purpose of electrically connecting unit cells with each other. Accordingly, the conventionally employed materials have been noble metals such as gold or platinum, and alloy metals between noble metal(s) and chromium. Evaporation or sputtering of the noble metals have been conventionally employed to form current collectors on the polarization and non-polarization electrodes. Therefore, the conventional production steps for solid state electric double layer capacitors have had problems not only in material costs, but also in production step costs.

SUMMARY OF THE INVENTION

The present invention provides solid state capacitive devices which are, in comparison with conventional devices, less expensive and more superior in small capacitance variations during operation for long hours in a wide temperature range, and which are further more superior in small potential loss during charging and discharging operations with operational voltages with a wide range and at a temperature within a wide temperature range.

DESCRIPTION OF THE PREFERRED EMBODIMENTS

The present invention provides a solid state electric double layer capacitor comprising a polarization electrode, a non-polarization electrode, and a solid electrolyte disposed at least between the polarization electrode and the non-polarization electrode, the polarization electrode being a mixture of carbon and the solid electrolyte, mixed with each other in a predetermined ratio, the non-polarization electrode being another mixture of the solid electrolyte and a composition containing Cu and a substance selected from a group consisting of $Cu_2S$ and $TiS_2$, and the solid electrolyte having a chemical composition of $K_xRb_{1-x}Cu_4I_yCl_{5-y}$ ($0.1 \leq x \leq 0.25$, $1.25 \leq y \leq 1.67$).

It is proposed in this application to employ a solid electrolyte of a chemical composition expressed by a formula of $K_xRb_{1-x}Cu_4I_yCl_{5-y}$, for a solid state electric double layer capacitor. It is also proposed here to employ a non-polarization (i.e., counter) electrode comprising the newly proposed solid electrolyte and a composition containing Cu and a substance selected from a group consisting of $Cu_2S$ and $TiS_2$. The solid state capacitor employing such a solid electrolyte and/or such a non-polarization electrode has much more superior capacitive device characteristics and can be produced at less expensive costs, in comparison with the conventional capacitive device.

Figure 1:
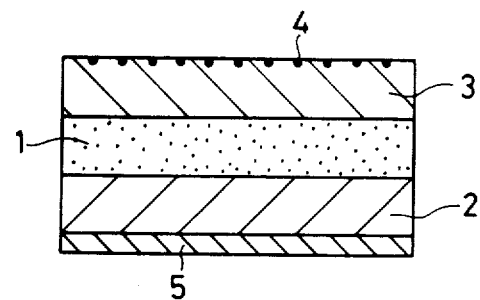
FIG. 1 is a cross-sectional view showing a unit cell of a solid state electric double layer capacitor embodying the present invention.

FIG. 1 is a cross-sectional view showing a unit cell of a solid state electric double layer capacitor in accordance with the present invention. The unit cell comprises a solid state electrolyte layer 1 of $Cu^+$ ionic conductivity, a polarization electrode 2, a non-polarization electrode 3, a current collector 4 for the non-polarization electrode 3, and another current collector 5 for the polarization electrode 2.

As constituents for the solid state electrolyte layer 1, cuprous halide and alkali halide (the alkali ion is selected from a group consisting of $Rb^+$ and $K^+$ ions) are heated at 140° C. for 4 hours to drive away water and halogen excess therefrom, and then mixed to result in $K_xRb_{1-x}Cu_4I_yCl_{5-y}$ ($0.1 \leq x \leq 0.25$, $1.25 \leq y \leq 1.67$). The $K_xRb_{1-x}Cu_4I_yCl_{5-y}$ reagent is pressed and molded in a molded pellet, and then heated in vacuum at 200°–250° C. for 17 hours. The heated pellet is slowly cooled down to room temperature, and then ground to result in the solid state electrolyte layer 1. $MeCu_4I_{1.5}Cl_{3.5}$ (Me: $Rb^+$ and $K^+$ ions) is the employed solid state electrolyte layer 1 in the following description with reference to the preferred embodiments.

The polarization electrode 2 is a mixture layer of carbon and the solid state electrolyte described above. 1 weight part of carbon and 9 weight parts of the solid electrolyte are mixed together, and the mixture is molded by a pressure of about 2 tons/cm² to obtain a pressed pellet. After the pressed pellet is heated in vacuum at 250°–300° C. for 8 hours, it is slowly cooled down to room temperature, and then ground to result in the polarization electrode 2.

The non-polarization electrode 3 is prepared by the following two ways. (i) Cu is added by 60 wt % to $Cu_2S$, and 10 wt % of the solid state electrolyte disclosed in the present application is mixed up with the mixture containing 60 wt % of electrolytic copper powder and 40 wt % of $Cu_2S$ to obtain a pressed pellet of a first kind for the non-polarizable electrode 3; wherein Cu, $Cu_2S$ and the electrolyte form a mixture. (ii) Alternatively, a pellet containing a compound of $Cu_xTiS_2$ ($0.7 < x < 0.9$) and electrolyte is prepared by firstly mixing $TiS_2$ and electrolytic copper powder, secondly molding the mixture to result in a molded pellet, thirdly heating the molded pellet in vacuum at 200° C. for 16 hours, fourthly gradually cooling the pellet down to room temperature, followed by grinding, and mixing with the solid state electrolyte disclosed in the present invention by 10-40 wt %, and fifthly molding the second mixture to obtain a pressed pellet of a second kind for the non-polarizable electrode 3; wherein Cu and $TiS_2$ form the compound $Cu_2TiS_2$ which form a mixture with the electrolyte.

In the present invention, the word composition is used to imply both the mixture and the compound.

The current collector 4 of the non-polarization electrode 3 is made of a Cu net (e.g. 60 meshes). The Cu net is pressed and buried in the surface of the non-polarization electrode at the same time of the compression molding of the latter.

These three layers, namely the electrolyte 1, the polarization electrode 2 and the non-polarization electrode 3 are stacked and molded by a pressure of 4 tons/cm² thereby obtaining the unit cell of the solid state electric double layer capacitor as shown in FIG. 1. A current collector 5 for the polarization electrode 2 is formed by evaporating, sputtering, or painting as paste, by use of electrochemically inert materials such as Pd and Pt group metals, Au and graphite (graphite can not be evaporated). The unit cell of FIG. 1 constitutes a component unit cell of a practical capacitor, which has a predetermined number of such unit cells connected in series in order to obtain a preferred breakdown voltage.

Figure 2:
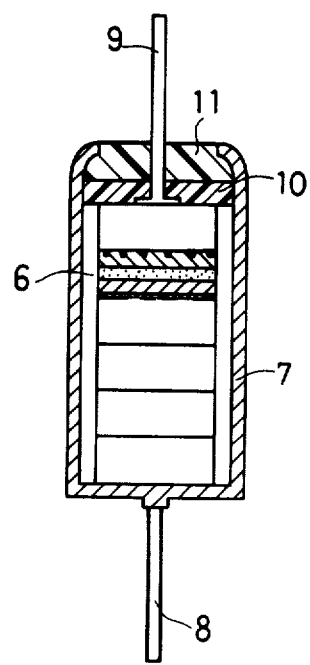
FIG. 2 is a cross-sectional view showing a component unit cell comprising a plurality of unit cells.

FIG. 2 is a cross-sectional view showing a component unit cell comprising a plurality of unit cells 6. The unit cells 6 are adhered with each other by use of graphite paste and disposed in a metal casing 7. The bottom face of the component unit cell is also adhered by use of graphite paste to an inner face of the metal casing 7. A lead wire 8 is electrically connected with the metal casing 7 by welding, soldering, or brazing. A lead wire 9 is similarly connected with a current collector 4 of a capacitive device unit cell at one top end of the stacking unit cells 6. A packing rubber 10 and a resin plate 11 for insulation are inserted at an opening part of the metal casing 7. After the insertion, the opening part of the metal casing 7 is curled inwards so as to press the stacking unit cells 6 against the bottom face of the metal casing 7.

Figure 3A:
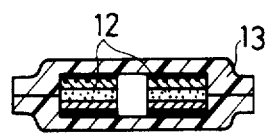
FIG. 3($a$) is a cross-sectional elevation view of another component unit cell of a flat type, and FIG. 3($b$) is a plan view of the same.
Figure 3B:
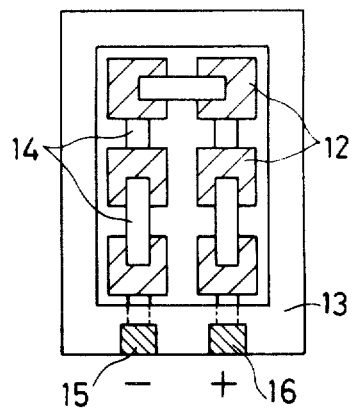

FIG. 3(a) is a cross-sectional elevation view of another component unit cell of a flat type. A unit cell 12 corresponds to the unit cell 6 shown in FIG. 2. FIG. 3(b) is a plan view of the flat type component unit cell, which comprises a plurality of the unit cells 12 connected with each other in series in a flat form. The connection is made by metal foil leads 14 adhered to upper and lower faces of the unit cells 12 by use of graphite paint. The connected unit cells 12 are inserted between thermal plastic resin films 13, and are sealed therein by thermally fusing the peripheries of the thermal plastic resin films 13. End portions of the thermal plastic resin films 13 are removed away so as to expose the metal foil leads 14 and to use them as terminal leads 15 and 16.

The capacitive device shown in FIG. 2 has an advantageous feature that the device can be obtained in a strongly stacked form. This form can be made compact, even if a relatively large number of the unit cells are employed for the purpose of obtaining a high breakdown voltage. On the other hand, the capacitive device shown in FIGS. 3(a) and 3(b) has another advantageous feature that the device can be obtained in a flat form.

Figure 4:
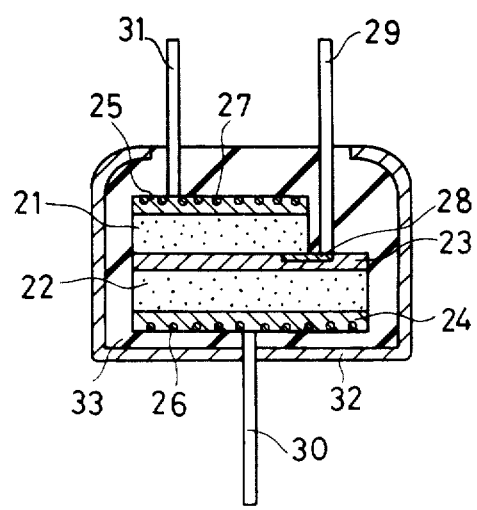
FIG. 4 is a cross-sectional elevation view of another capacitive device embodying the present invention.

FIG. 4 is a cross-sectional elevation view of a capacitive device in accordance with another embodiment of the present invention. The capacitive device comprises solid electrolyte layers 21 and 22, a polarization electrode 23, a non-polarization electrode 24 and a reference electrode 25. The solid electrolyte layers 21 and 22 are $Cu^+$ ionic conductive and have chemical compositions disclosed in the instant application. Current collectors 26 and 27 are made of Cu nets and used for the non-polarization electrode 24 and the reference electrode 25, respectively. A current collector 28 of an Au wire is used for the polarization electrode 23. After connecting wire leads 29, 30 and 31 with the current collectors of the polarization electrode 23, the non-polarization electrode 24 and the reference electrode 25, respectively, the capacitive device with three wire leads 29, 30 and 31 is placed in a casing 32 and sealed therein by use of resin 33. The capacitive device with the three electrode structure has more superior electric characteristics in comparison with the capacitive device with the two electrode structure where an output voltage is affected by the influence of the counter electrode. This influence of the counter electrode can be removed by employing three electrodes, i.e. a reference electrode besides two electrodes. No current flows to or from the reference electrode, and a voltage of the polarization electrode against that of the reference electrode becomes independent from the influence caused by the counter electrode. The capacitive device of the structure shown in FIG. 4 is employed for potential variation measurements at the non-polarization (i.e. counter) electrode during charging and discharging operations.

Figure 5:
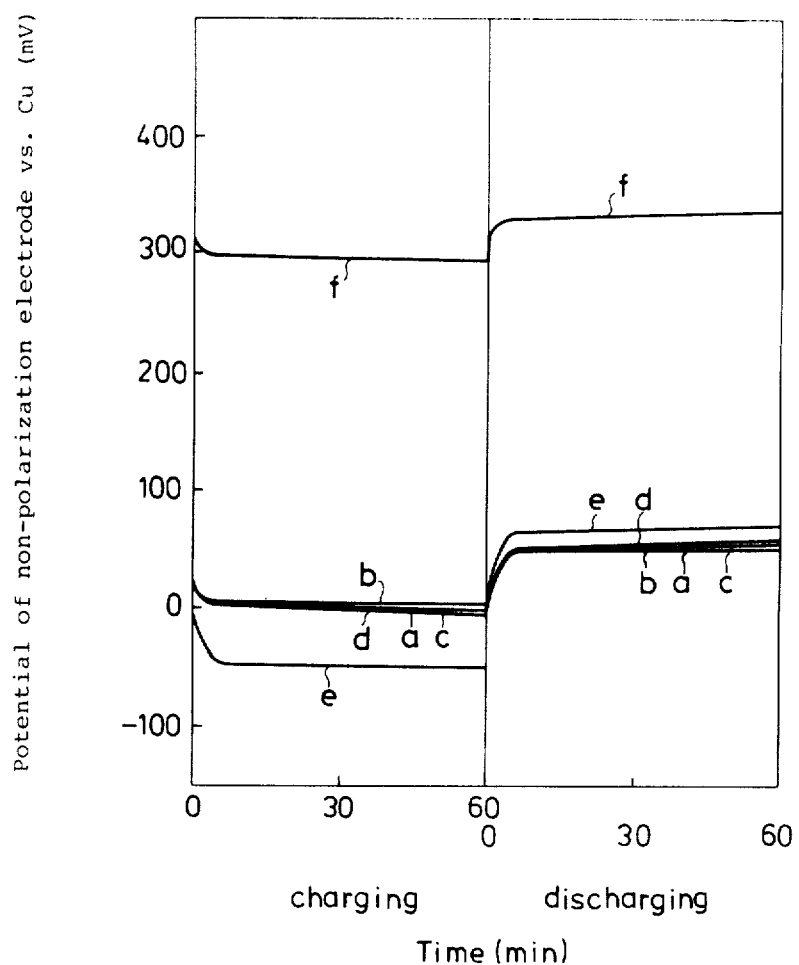
FIG. 5 is a graph showing potential variations of a non-polarization electrode versus a Cu reference electrode.

FIG. 5 is a graph showing potential variations of a non-polarization electrode versus a Cu reference electrode, which potential variations are obtained from capacitive devices with the tri-electrode structure shown in FIG. 4. The polarization electrodes are mixtures of active charcoal and the same solid electrolytes in a proportion of 10 percent by weight for the active charcoal. Mixtures of Cu and the same solid electrolytes in a proportion of 20 percent by weight for the solid electrolytes, are used for the reference electrodes.

The employed capacitive devices are 10 mm in diameter, and comprise solid electrolyte layers, the non-polarization electrode and the reference electrode weighing 0.2 g, respectively, and the polarization electrode weighing 0.1 g.

The potential variations of the non-polarization electrodes are measured with a constant current of 100 μA and with a one hour repetition cycle for charging and discharging operations. The curves "a", "b", "c" and "d" are measurement results of the non-polarization electrodes comprising respectively 90, 80, 70 and 60 wt % of Cu contained in $Cu_xTiS_2$. The curve "e" is obtained for a counter electrode comprising 60 wt % of Cu against $Cu_2S$ and mixed therewith. The curve "f"

corresponds to measurement results obtained for a counter electrode containing $Cu_2S$ alone.

Figure 6:
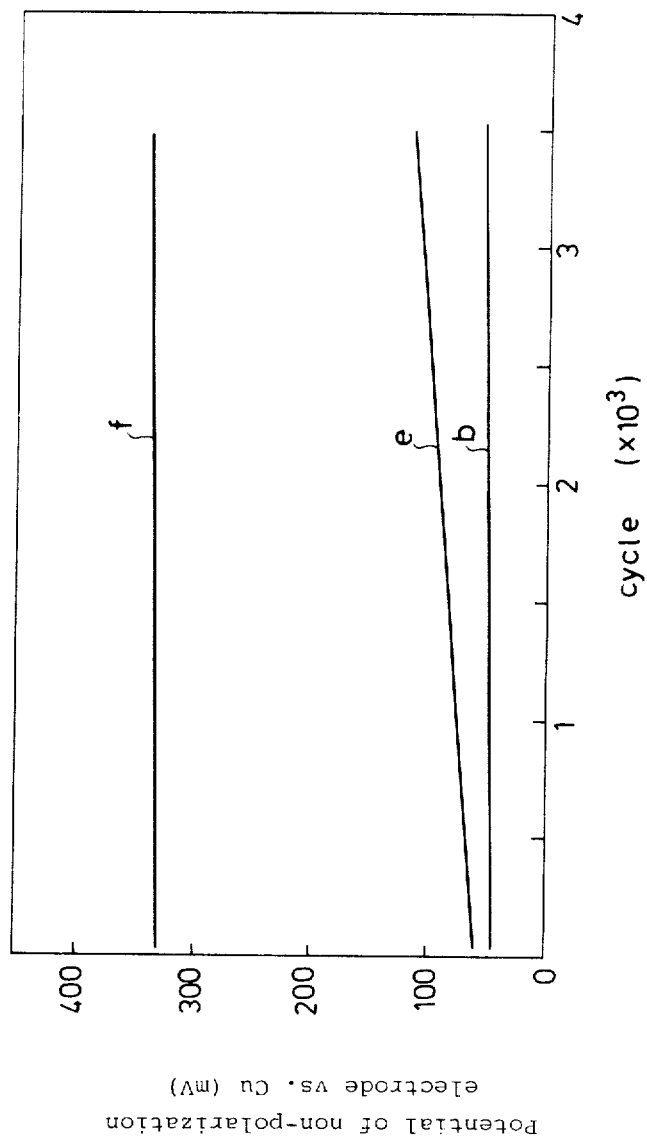
FIG. 6 is a graph showing potential variations of non-polarization electrodes at the end of discharging cycles.

Additional potential variation measurements are carried out for the capacitive devices used for obtaining the curves shown in FIG. 6. FIG. 6 is a graph showing potential variations of the non-polarization electrodes vs. Cu at the end of discharging cycles. The potential variation measurements are made with a constant current of 100 μA and with a one hour repetition cycle for charging and discharging operations. The designation for the curves obtained is made in the same way as the case of FIG. 5.

Figure 7:
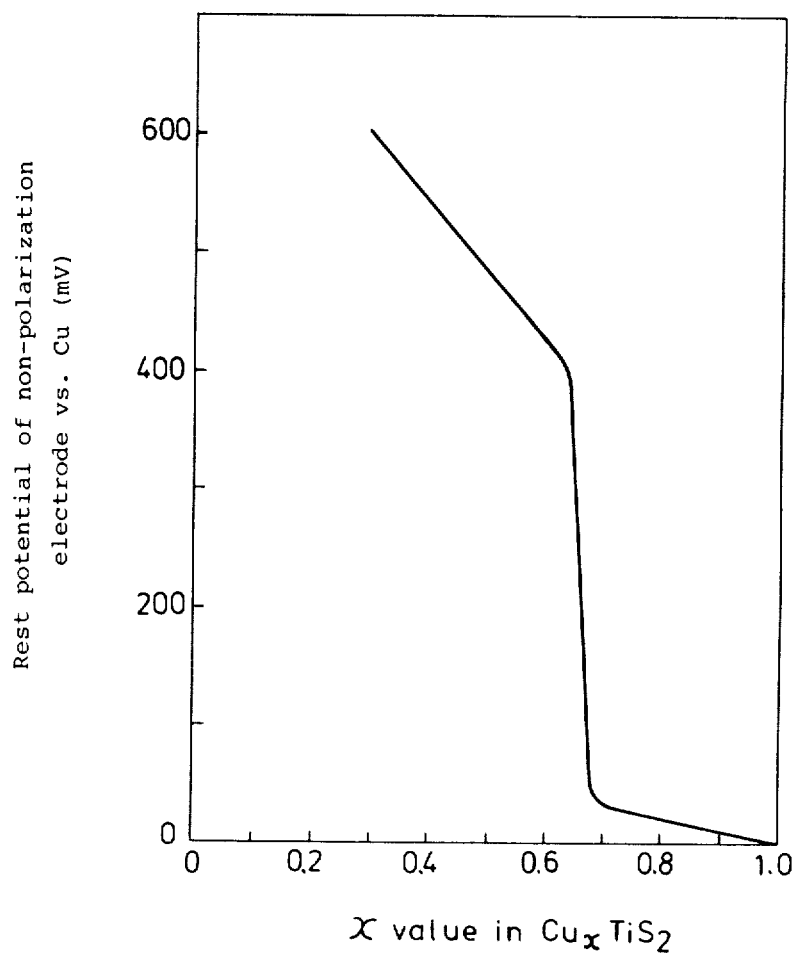
FIG. 7 is a graph showing a rest potential of a non-polarization electrode vs. Cu, for x values of $Cu_xTiS_2$.

FIG. 7 is a graph showing a rest potential of a non-polarization electrode vs. Cu for a solid state electric double layer capacitor produced in accordance with the following conditions. The capacitor has a tri-electrode structure similar to that shown in FIG. 4. It is 10 mm in diameter. The employed solid electrolytes are $K_{0.1}Rb_{0.9}Cu_4I_{1.5}Cl_{3.5}$ for the solid electrolyte layers and the three electrodes. The two solid electrolyte layers respectively weigh 0.2 g. The non-polarization electrode weighing 0.2 g is prepared by mixing the solid electrolyte by 10-40 wt % and $Cu_xTiS_2$. The $Cu_xTiS_2$ is obtained by mixing $TiS_2$ with electrolytic copper powder by 30-90 wt % for Cu. The polarization electrode weighing 0.1 g is prepared by mixing active charcoal and the solid electrolyte in a proportion of 10 percent by weight for the active charcoal. The reference electrode weighing 0.2 g is obtained by mixing Cu and the solid electrolyte in a proportion of 20% by weight for the latter.

It is observed from the measurement results shown in FIGS. 5, 6 and 7 that the capacitive devices employing $Cu_xTiS_2$ ($0.7 \leq x \leq 0.9$) for the non-polarization electrodes and the solid electrolyte with a composition disclosed in the instant application, have the following advantageous features. That is, (i) the rest potential of the non-polarization electrode is close to the Cu potential, (ii) polarization is small during the charging and discharging operations thus providing a possibility of taking full advantage of the highest breakdown voltage obtainable for such devices (this situation is preferable because storage energy density becomes higher, when the applicable voltage can be increased), and further (iii) potential loss during the charging and discharging operations can be minimized.

Figure 8:
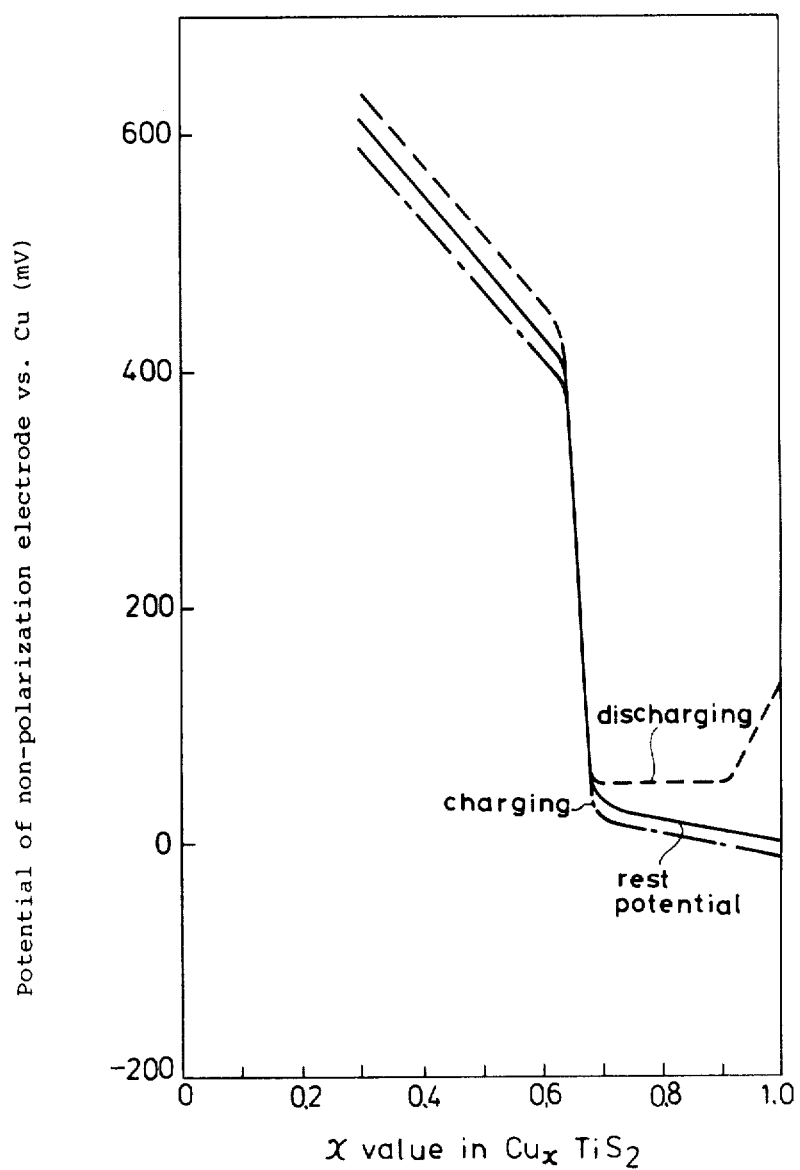
FIG. 8 is a graph showing potential variations of non-polarization electrodes vs. Cu for x values of $Cu_x$-$TiS_2$.

Potential measurements are further carried out for capacitive devices produced in a similar manner to the case for FIG. 7 except in that an amount of a solid electrolyte contained in the non-polarization electrode is set to be constant at 30 wt. %. FIG. 8 is a graph showing potential variations of the non-polarization electrode vs. Cu for the solid state capacitive device comprising $Cu_xTiS_2$ constituents with various x values and contained in the non-polarization electrodes. The capacitive devices are used for the potential variation measurements with a current density of 1.27 mA/cm² for charging and discharging operations. The potentials are measured for steady states 5 minutes after flowing currents respectively in two directions. Rest potentials are measured similarly for steady states 5 minutes after current flow stopping.

Figure 9:
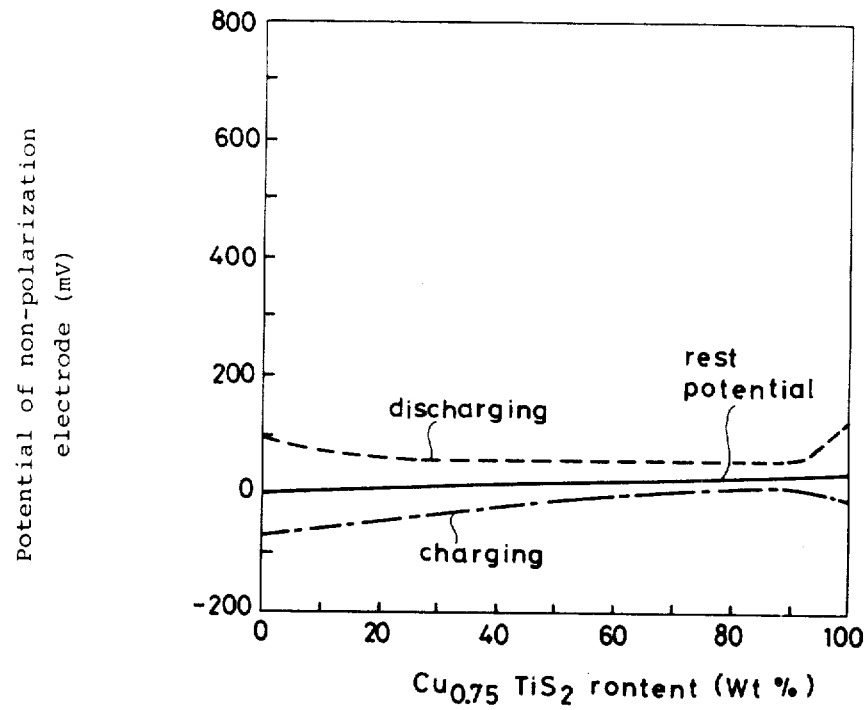
FIG. 9 is a graph showing polarization variations of non-polarization electrodes for solid state capacitive devices comprising $Cu_{0.75}TiS_2$ mixed with solid electrolytes by various wt % mixing ratios in the non-polarization electrodes.

FIG. 9 is a graph showing the potential of non-polarization electrodes for solid state capacitive devices comprising $Cu_{0.75}TiS_2$ mixed with solid electrolytes by various wt % mixing ratios in the non-polarization electrodes.

It can be seen from FIGS. 8 and 9 that the non-polarization electrode potentials are close to the Cu potential for the x values of 0.7-0.9, that the polarization (i.e. potential loss) is small during the charging and discharging operations, and that the polarization is extremely small for the solid state capacitive devices comprising $Cu_{0.75}TiS_2$ mixed with solid electrolyte by 10-40 wt % for the latter.

Two kinds of solid state capacitive devices provided with non-polarization electrodes are produced for the following comparative measurements (to be described with reference to FIGS. 10 and 11).

Figure 10:
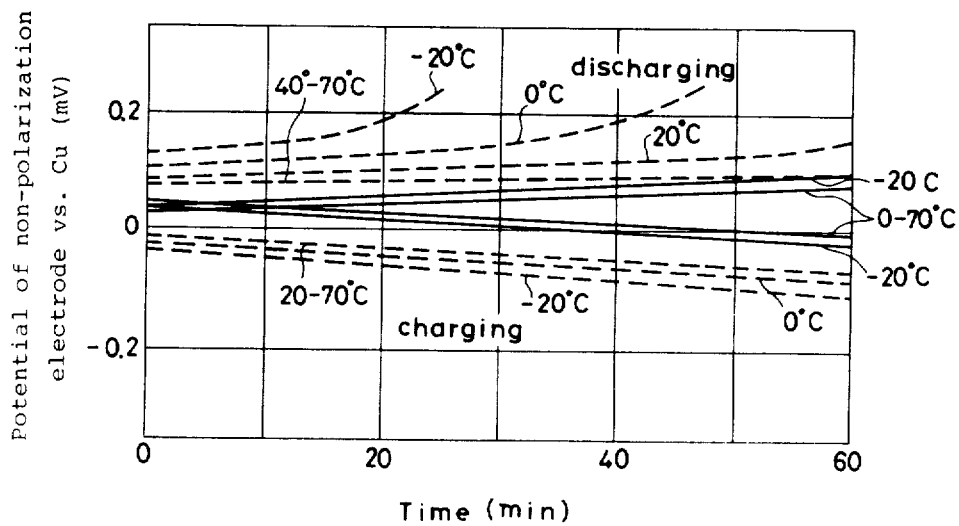
FIG. 10 is a graph showing potential variations of non-polarization electrodes vs. Cu for various temperature ranges for two kinds of the non-polarization electrodes.

FIG. 10 is a graph showing potential variations of non-polarization electrodes vs. Cu for various temperature ranges for two kinds of the non-polarization electrodes. The non-polarization electrodes are prepared either by mixing $Cu_xTiS_2$ with x=0.75 with a solid electrolyte by 25 wt % for the latter, or by mixing a solid electrolyte by 25 wt % therefor with a composition containing Cu and $Cu_2S$ in a proportion of 60 wt % for the former. The non-polarization electrodes weigh 0.2 g and are 10 mm in diameter. Potential variations are measured with a constant flowing current of 1 mA for both charging and discharging operations. Solid lines in FIG. 10 correspond to measurement results for the non-polarization electrode (I) comprising $Cu_xTiS_2$ with x=0.75, and dotted lines correspond to measurement results for the non-polarization electrode (II) comprising Cu and $Cu_2S$ mixed with each other in the mixing ratio described above. Anodic polarization (discharging polarization) becomes larger when the measurement temperature is lowered, for the non-polarization electrode (II). On the other hand, the solid state capacitive device employing the non-polarization electrode (I) has a distinctive feature in that no large polarization can be observed up to $-20°$ C.

Figure 11:
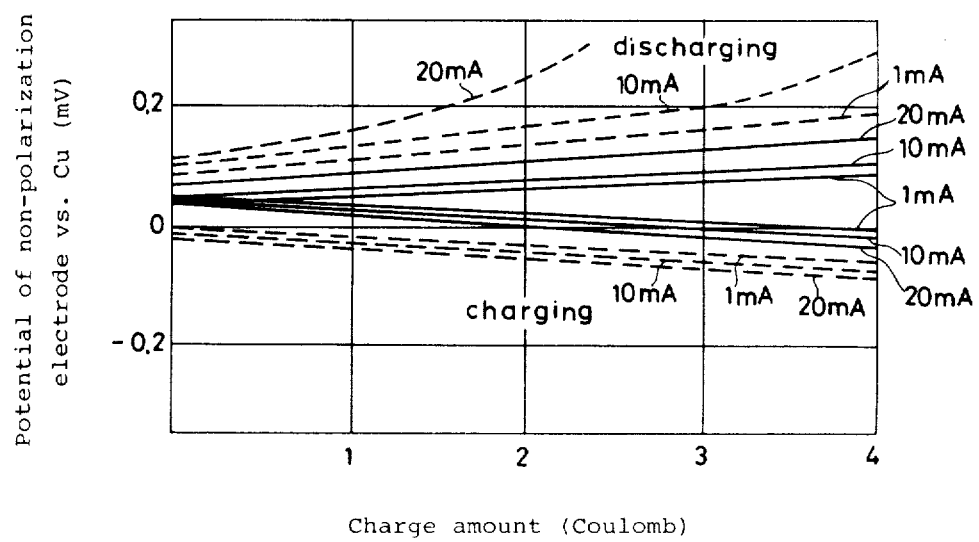
FIG. 11 is a graph showing potential variations of non-polarization electrodes vs. Cu for various charging and discharging current densities at room temperature and for two kinds of the non-polarization electrodes.

FIG. 11 is a graph showing variations of potential of non-polarization electrodes vs. Cu for various charging and discharging current densities at room temperature and for the two kinds of the non-polarization electrodes (I) and (II), described above. Solid lines and dotted lines in FIG. 11 similarly correspond to measurement results for the non-polarization electrodes (I) and (II), respectively.

It is found that polarization rapidly increases for the case of the non-polarization electrode (II), when a discharging operation is made with a current density more than 20 mA. On the other hand, no increase of the polarization can be observed for the non-polarization electrode (I), even when a discharging operation is made with a current density of 100 mA (this case is not shown in FIG. 11).

The measurement results shown in FIGS. 10 and 11 can be summarized as follows:

(i) The polarization values are small even at a low temperature region and for a large current density in the case of the non-polarization electrode (I).

(ii) Since the polarization variations in dependence on temperature and current density are small, it can be expected to obtain the following advantageous features when the non-polarization electrode (I) is employed for solid state electric double layer capacitors. The advantageous features reside in the that obtainable output energy can be increased and further that output energy variations in dependence on temperature and current density can be made small.

(iii) The solid state electric double layer capacitors employing the non-polarization electrode (I) proposed in the instant application is more superior in comparison with the conventional solid state electric double layer capacitors in that reversible characteristics are better. This is confirmed by on-and off-measurements of 10,000 on- and off-operations with a one hour repetition cycle, measurement results thereof showing no changes in device characteristics.

Figure 12:
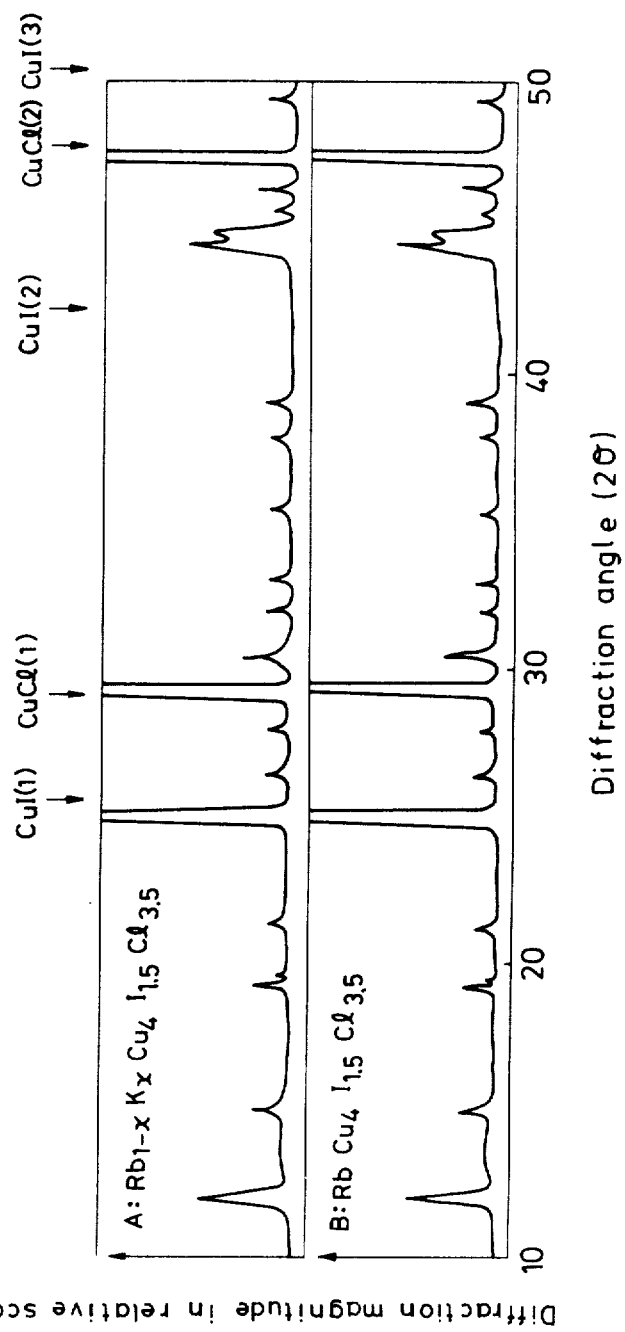
FIG. 12 is graphs showing X-ray diffraction patterns for two kinds of solid electrolytes which comprise either Rb ions alone or Rb and K ions.

FIG. 12 contains graphs showing X-ray diffraction patterns for two kinds of solid electrolytes which comprise either Rb ions alone or Rb and K ions. The upper pattern is obtained for a solid electrolyte (A: $Rb_{1-x}K_xCu_4I_{1.5}Cl_{3.5}$) proposed in the present application, and the lower pattern is obtained for another solid electrolyte (B: $RbCu_4I_{1.5}Cl_{3.5}$). These solid electrolytes (A) and (B) are prepared by firstly mixing KCl (for the former case only), RbCl, CuCl and CuI, which were pre-heated at 140° C. for 2 hours in the air in advance, then molding the mixture to result in pressed pellets, further heating the pellets in vacuum at 250° C. for 17 hours and gradually cooling them to room temperature, and finally grinding the cooled pellets. From the X-ray diffraction pattern analysis, it is revealed that the resulted solid electrolytes (A) and (B) are compositions different from all of the constituents thereof, and that two compositions with K ions and without K ions have crystal structures much similar to each other.

Figure 13:
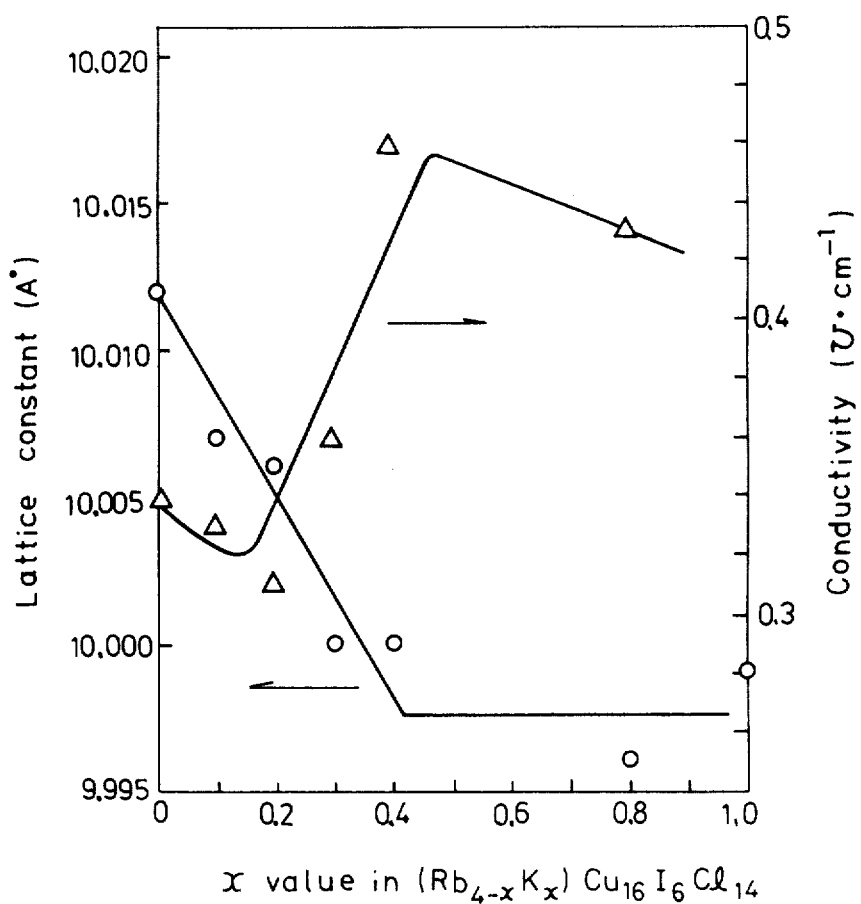
FIG. 13 is a graph showing lattice constant values and conductivity variations at room temperature for solid electrolytes with various chemical compositions.

FIG. 13 is a graph showing lattice constant values and conductivity variations at room temperature for solid electrolytes with various chemical compositions. It is revealed from FIG. 13 that the lattice constant values become smaller with increasing the K ion content, and that the conductivities become about 50% higher for $0.4 \leq x \leq 1.0$ than the case of the solid electrolyte (B) containing no K ions.

Figure 14:
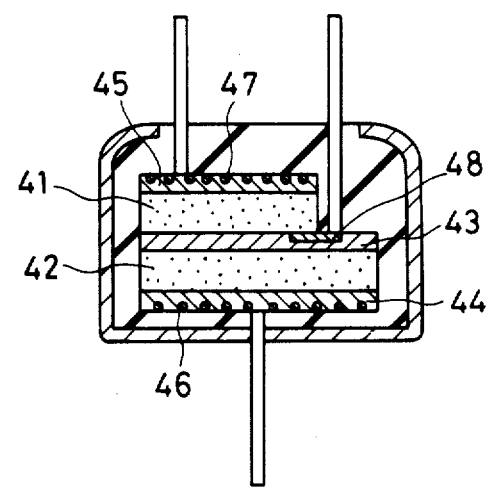
FIG. 14 is a cross-sectional view showing a solid state capacitive device with a tri-electrode structure.

Solid state electric double layer capacitive devices are produced by using the two kinds of the solid electrolytes (A) and (B) described above, for the purpose of comparing them with each other in device characteristics' point of view. FIG. 14 is a cross-sectional view showing one of the solid state capacitive device with a trielectrode structure. The device of FIG. 14 comprises solid electrolyte layers 41 and 42, a polarization electrode 43, a non-polarization electrode 44, a reference electrode 45, a current collector 46 for the non-polarization electrode 44, a current collector 47 for the reference electrode 45, and a current collector 48 for the polarization electrode 43.

Either one of the two kinds of the solid electrolytes (A) and (B) described above is employed for the solid electrolyte layers 41 and 42. The polarization electrode 43 is prepared by a mixture of active charcoal and the selected solid electrolyte (A) or (B). The non-polarization (i.e. counter) electrode 44 comprises the selected solid electrolyte (A) or (B), and a composition of $TiS_2$ and Cu in a proportion of 30 wt % for the former and 70 wt % for the latter. The reference electrode 45 is a mixture of Cu and the selected solid electrolyte. The current collector 46 for the non-polarization electrode 44 is a Cu net buried into the non-polarization electrode 44. The current collector 47 of the reference electrode 45 in Cu. The current collector 48 of the polarization electrode 43 is formed by sputtering graphite or by painting graphite paste. The solid electrolyte layer 41, the reference electrode 45 and the current collector 47 therefor are provided for the purpose of correctly measuring potential variations of the polarization and non-polarization electrodes (these portions are not always necessary to be formed for a solid state capacitor).

The polarization electrode 43 weighs 0.1 g, the solid electrolyte layers 41 and 42 weight 0.2 g, respectively, and the other electrodes 44 and 45 weigh 0.2 g. The completed solid state capacitive devices are 10 mm in diameter in a column shape.

Figure 15A:
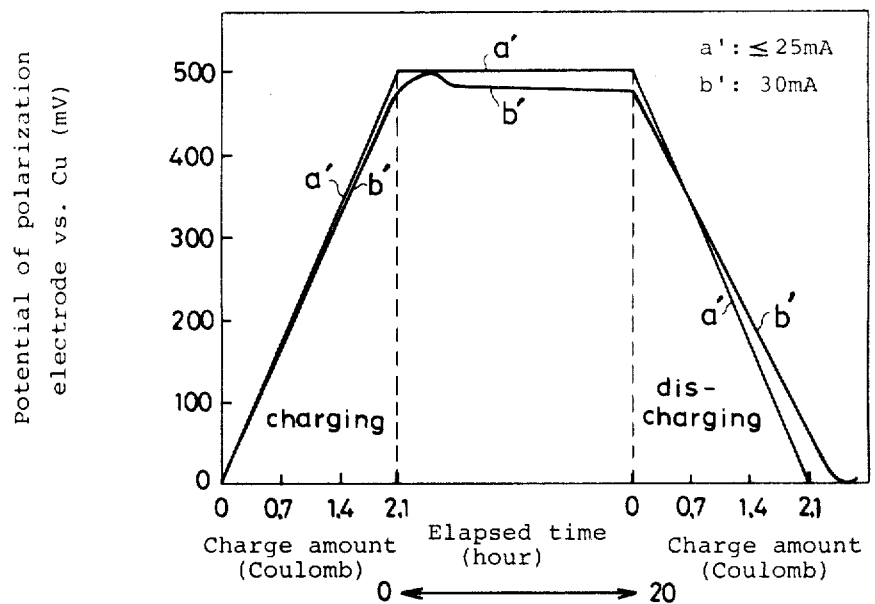
FIGS. 15($a$) and 15($b$) are graphs showing potential variations of polarization electrodes vs. Cu during charging, discharging and open circuit standing.
Figure 15B:
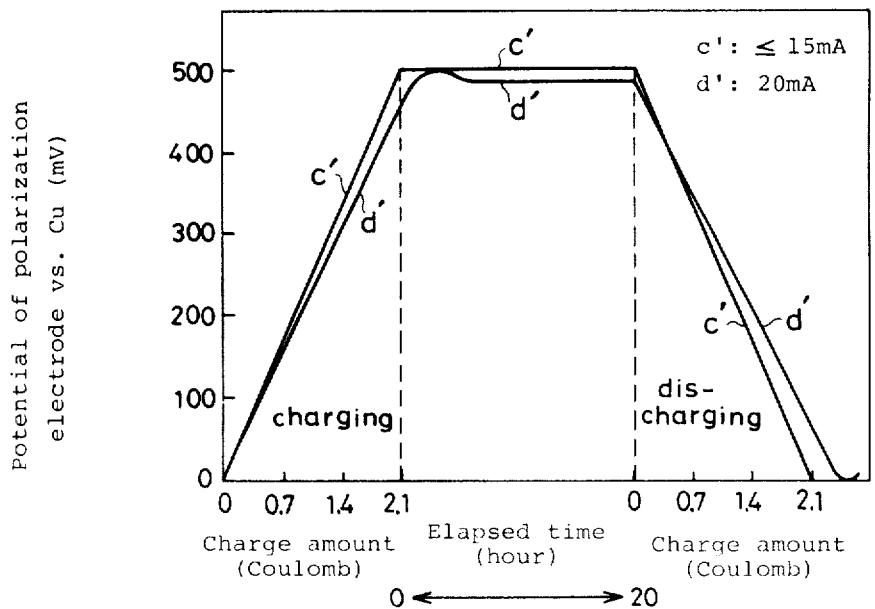

FIGS. 15(a) and 15(b) are graphs showing potential variations of polarization electrodes vs. Cu during charging, discharging, and open circuit standing. Potential variation curved in FIG. 15(a) are obtained by the solid state capacitive device employing the solid electrolyte (A) containing Rb and K ions. Other potential variation curves in FIG. 15(b) are obtained by the solid state capacitive device employing the solid electrolyte (B) without K ions.

It is revealed from FIG. 15(b) that the solid state capacitive device employing the solid electrolyte (B) without K ions has the following adverse shortcomings. When a current of 20 mA flows through a solid electrolyte layers, there occurs potential variation changes thought to be due to traveling lag of the ions contained in the solid electrolyte (B). The traveling lag phenomenon is reflected in low speeds of the potential rising and in overshoot phenomenon for the potential after stopping the current flow (cf. curve "d" in FIG. 15(b)).

On the other hand, it is revealed from FIG. 15(a) that such an adverse overshoot phenomenon is not observed up to 30 mA current flowing for the case of the solid electrolyte (A) containing Rb and K ions.

Figure 16A:
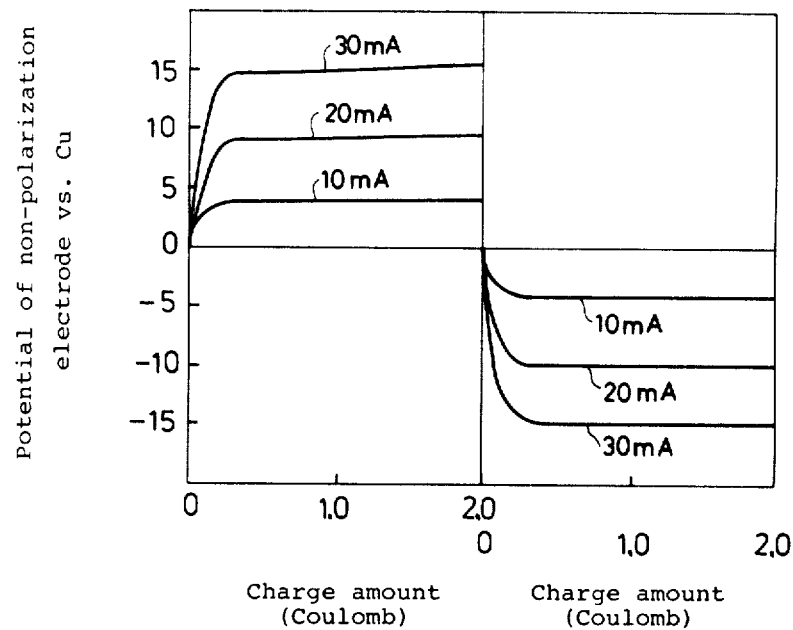
FIGS. 16($a$) and 16($b$) are graphs showing potential variations of non-polarization electrodes vs. Cu with respect to flowing charge amount.
Figure 16B:
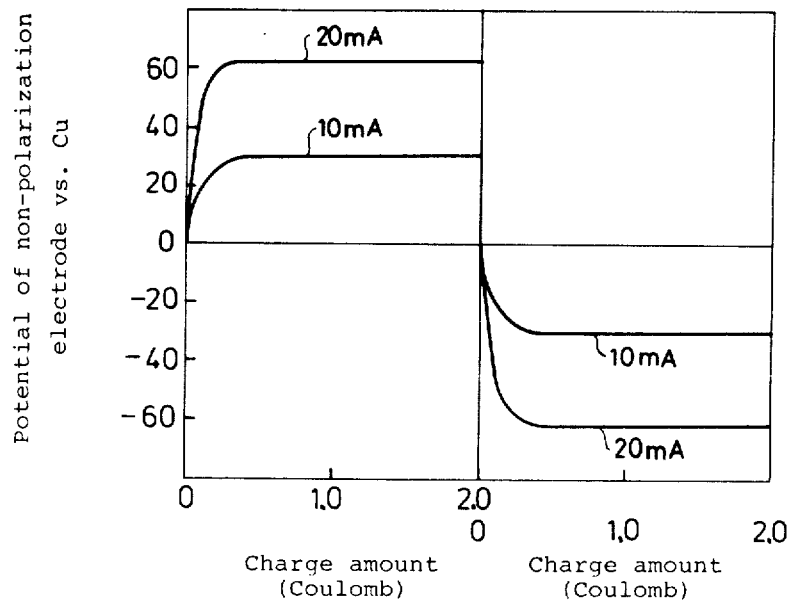

FIGS. 16(a) and 16(b) are graphs showing potential variations of non-polarization electrodes vs. Cu with respect to flowing charge amounts, obtained by using the solid state capacitive devices produced for the measurements for FIGS. 15(a) and 15(b). Potential variation curves in FIG. 16(a) are obtained by the solid state capacitive device employing the solid electrolyte (A) containing Rb and K ions. Other potential variation curves in FIG. 16(b) are obtained by the solid state capacitive device employing the solid electrolyte (B) without K ions.

It is revealed from the measurement results in FIGS. 16(a) and 16(b) that polarization magnitude can be remarkably decreased by employing the solid electrolyte (A) containing Rb and K ions.

As another embodiment, solid state capacitive devices are produced in the following conditions. A polarization electrode weighing 0.1 g is a mixture of active charcoal and a solid electrolyte with a composition ratio disclosed in the instant application, mixed with each other in a proportion of 10 wt % for the former. A solid electrolyte layer weighs 0.2 g. A non-polarization (i.e. counter) electrode weighing 0.2 g comprises the solid electrolyte and a composite mixture of $Cu_2S$ and Cu mixed with each other in a proportion of 40 wt % for the former and 60 wt % for the latter.

Current collectors for the polarization and non-polarization electrodes are formed by applying graphite paint on the surfaces thereof and by caking the applied layers with warm wind and cool wind. The completed solid state capacitive devices are 10 mm in diameter and in a column shape. Obtained capacitances are 3 farads and breakdown voltages are 0.6 V.

For comparison, solid state capacitive devices are produced by employing in a conventional manner current collectors which are formed by evaporating gold, platinum, chromium, or alloys of Au and Cr or Pt and Cr. It is natural that graphite paint is much less expensive in comparison with noble metals and alloys containing noble metals.

Figure 17:
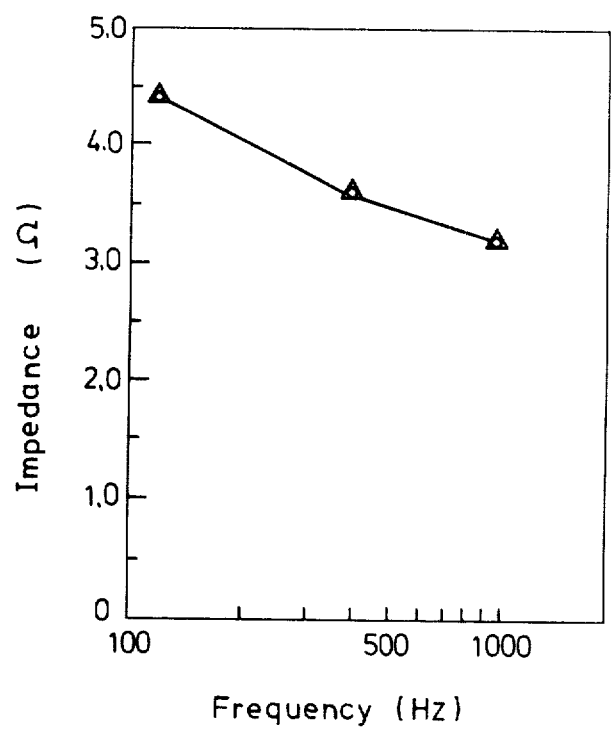
FIG. 17 is a graph showing impedance dependencies on frequency for comparing a conventional capacitive device with a capacitive device embodying the present invention.

As one of the electric characteristics, impedance measurements are made for the two kinds of the solid state capacitive devices. FIG. 17 is a graph showing impedance dependencies on frequency for comparing a conventional capacitive device with a capacitive device embodying the present invention. Curves denoted by "O" are measurement results for the capacitive device provided with the current collectors prepared in a conventional method. On the other hand, curves denoted by "Δ" are measurement results for the capacitive device provided with the current collectors formed by use of graphite paint.

It is confirmed by FIG. 17 that there is no difference between the two devices. The employment of the graphite paint disclosed in the present application has the following advantages in comparison with the conventional forming method.

(i) Capacitive devices can be produced in a shorter time period, since working efficiency accompanied with the formation of the current collectors can be improved (there is no need to carry out vacuum evaporation or sputtering).

(ii) When capacitive devices are produced by stacking a plurality of unit cells which are electrically connected with each other by use of graphite paint, contact resistances at the connecting portions can be lowered. This advantages features arise from strong adherence and large contacting areas. These features are easily obtainable, since the graphite paint is liquid.

(iii) The graphite paint has a thermal expansion coefficient smaller than those of metals, and thus it is applicable for conditions subjected to large temperature changes.

Therefore, the employment of the graphite paint provides a possibility of producing with fewer production steps solid state electric double layer capacitive devices which are less expensive in comparison with the conventional solid state capacitors.

It is further proposed in the present application to carry out a heat treatment in vacuum for constituents of electrodes. Unit cells of solid state capacitive devices are similarly produced. The devices respectively comprise a polarization electrode weighing 0.1 g, a solid electrolyte layer weighing 0.2 g and a counter electrode weighing 0.2 g. The completed capacitive devices are 10 mm in diameter and in a disk shape. They are used for capacitance measurements, to be described below.

Figure 18:
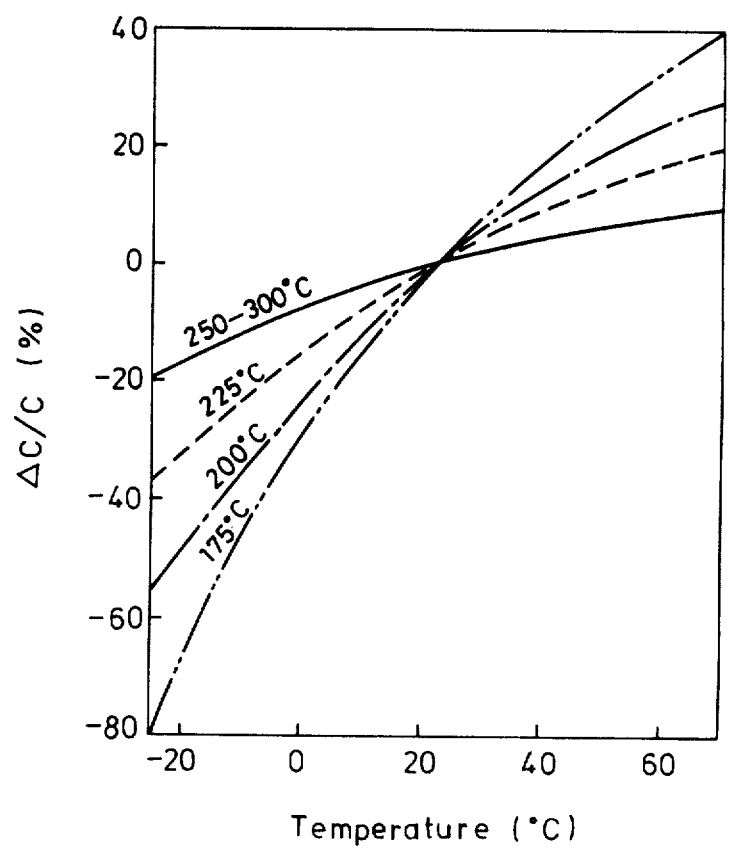
FIG. 18 is a graph showing capacitance variation dependencies on temperature.

FIG. 18 is a graph showing the capacitance variation dependencies on temperature. Curves shown there are obtained for the capacitive devices and, the counter electrodes thereof are produced in the same manner as the case of $Cu_xTiS_2$ and the polarization electrodes thereof and heat-treated in vacuum at several temperatures for 8 hours.

Figure 19:
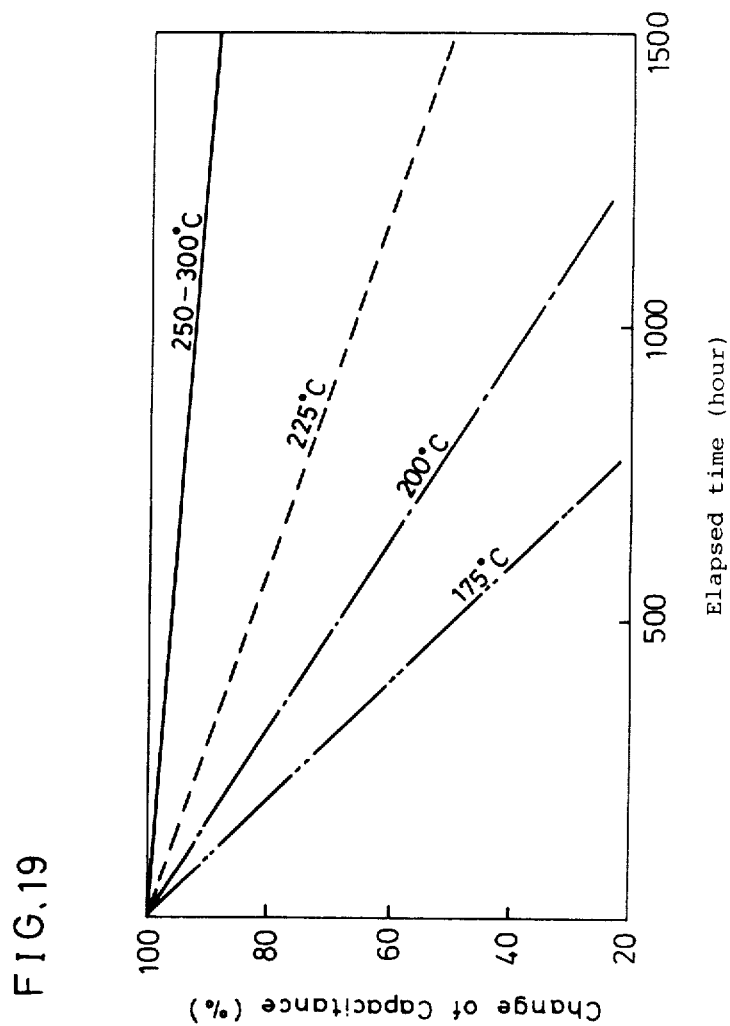
FIG. 19 is a graph showing capacitance changes with respect to elapsed time after application of a voltage of 0.55 V/cell.

FIG. 19 is a graph showing capacitance changes with respect to elapsed time after application of a voltage of 0.55 V at 70° C. The measurements are made for the capacitive devices used in the case of FIG. 18.

Figure 20:
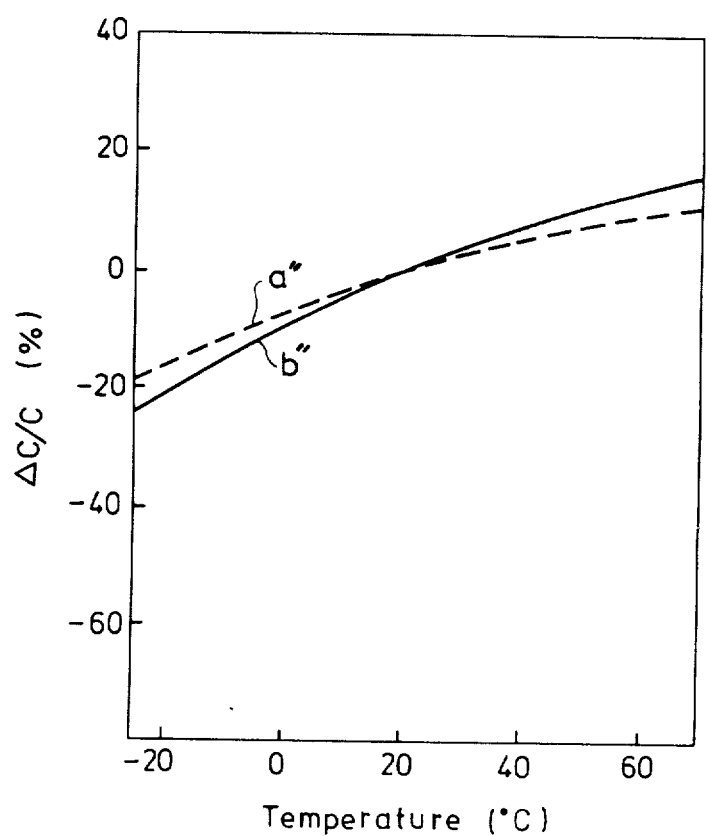
FIG. 20 is a graph showing capacitance change dependencies on temperature.

FIG. 20 is a graph showing capacitance change dependencies on operation temperature. The heat treatment is made at 275° C. for various hours (a″: 8-12 hours, b″: 4 hours). It is revealed from these measurement results that the capacitance variation dependencies on temperature and the capacitance changes with respect to elapsed time can be remarkably lowered, by carrying out a heat treatment in vacuum at 250°-300° C. for 8 hours, for the constituents of the polarization electrode.

What is claimed is:

1. A solid state electric double layer capacitor comprising:
   a polarization electrode,
   a non-polarization electrode, and
   a solid electrolyte disposed at least between said polarization electrode and said non-polarization electrode,
   said polarization electrode being a mixture of carbon and said solid electrolyte, mixed with each other in a predetermined ratio,
   said non-polarization electrode being another mixture of said solid electrolyte and a composition containing Cu and a substance selected from a group consisting of $Cu_2S$ and $TiS_2$, and
   said solid electrolyte having a chemical composition of $K_xRb_{1-x}Cu_4I_yCl_{5-y}$ ($0.1 \leq x \leq 0.25$, $1.25 \leq y \leq 1.67$).

2. A solid state electric double layer capacitor in accordance with claim 1 further comprising a reference electrode which comprises said electrolyte.

3. A solid state electric double layer capacitor in accordance with claim 1 further comprising current collectors for said polarization and said non-polarization electrodes.

4. A solid state electric double layer capacitor in accordance with Claim 1, 2 or 3, wherein said non-polarization electrode is a mixture of 10 wt % of said solid electrolyte and 90 wt % of a composition which comprises 60 wt % of Cu and 40 wt % of $Cu_2S$.

5. A solid state electric double layer capacitor in accordance with claim 1, 2 or 3, wherein said non-polarization electrode is a mixture of a compound of $Cu_xTiS_2$ ($0.7 \leq x \leq 0.9$) and said solid electrolyte.

6. A solid state electric double layer capacitor in accordance with Claim 1, 2 or 3, wherein said mixture for said polarization electrode is a mixture heat-treated in vacuum at 250°-300° C.

7. A solid state electric double layer capacitor in accordance with claim 3 further comprising graphite paint layers on said current collectors for both electrodes.

* * * * *